S. B. MILLER.
PLAYING CARDS.
APPLICATION FILED FEB. 25, 1915.
1,146,808. Patented July 20, 1915.
Fig. 1. — SAVAN — Je vis en espoir. French.
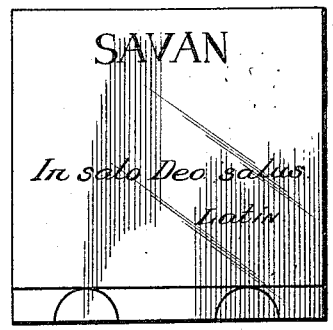
Fig. 5. — SAVAN — In solo Deo salus. Latin.
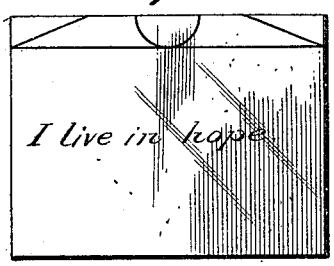
Fig. 2. — I live in hope.
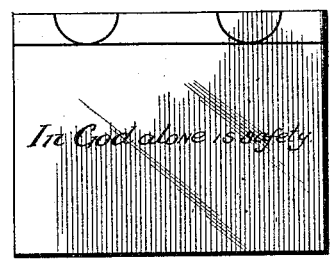
Fig. 6. — In God alone is safety.
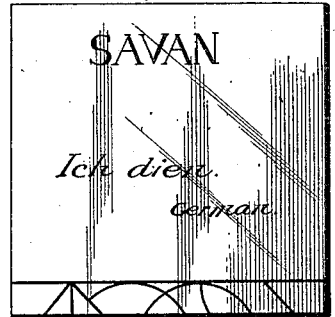
Fig. 3. — SAVAN — Ich dien. German.
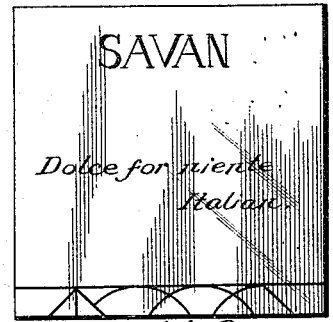
Fig. 7. — SAVAN — Dolce for niente. Italian.
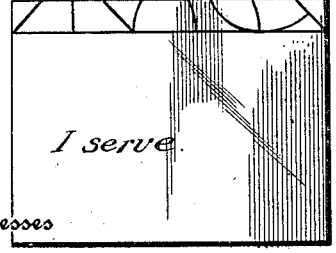
Fig. 4. — I serve.
Fig. 8. — Sweet doing-nothing.
Witnesses
W. A. Williams
Rea P. Wright
Inventor
S. B. Miller.
By E. B. Hocking, Attorney

UNITED STATES PATENT OFFICE.

SHREWSBURY B. MILLER, OF FAIRMONT, WEST VIRGINIA.

PLAYING-CARDS.

1,146,808.   Specification of Letters Patent.   Patented July 20, 1915.

Application filed February 25, 1915. Serial No. 10,483.

*To all whom it may concern:*

Be it known that I, SHREWSBURY B. MILLER, a citizen of the United States, residing at Fairmont, in the county of Marion and State of West Virginia, have invented certain new and useful Improvements in Playing-Cards, of which the following is a specification, reference being had therein to the accompanying drawing.

This invention relates to an improved game known as "Savan" and is adapted for the study of any language in order to familiarize the players with some of the ordinary and much-quoted expressions of the foreign countries such as is found in books, newspapers, etc., as well as to afford pastime and amusement to the players.

The game is also of educational advantage by teaching foreign languages and by changing the words and translations on the cards, they can be used for teaching history and other subjects of national interest.

I am aware that card games, prior to my invention, have been used for teaching foreign languages, but they were played entirely different and were not composed of two packs of mating cards, one pack having words or phrases printed in different foreign languages thereon, and the other pack having words and phrases in translation; one pack having along one of its marginal edges, a design adapted to match a design printed along the marginal edge of the other pack to insure the proper translation.

Other and further objects and advantages of the invention will be hereinafter set forth and the novel features thereof defined by the appended claims.

In the drawings—Figures 1 and 2, show sample cards, one of each pack used in my improved game, the card shown in Fig. 1 having a word printed thereon in French and the card shown in Fig. 2, containing the translation in English; and Figs. 3 to 8, show other samples of cards with words and phrases of different languages with the translations on the mating cards thereof.

In carrying out my invention, I employ two packs of cards of forty-eight cards each, one set of forty-eight cards being of a greater size than the other set, the larger set having printed thereon, quotations from foreign languages and the other set, or the smaller cards, having printed thereon, the translations of the expressions.

In constructing the two packs of cards used in carrying out my invention, a single pack is first constructed having a design printed thereon and the card is then cut transversely of said design so as to form cards of different sizes, the larger card having the words or phrases of the foreign languages printed thereon and the smaller card, the translation of the words or phrases of the foreign languages. By this construction, it will be seen that two cards are formed, one having a word or phrase of a foreign language printed thereon and the other having the translation, the marginal edges having a portion of the design thereon so that by matching the design on the smaller card with the design on the larger card, the player will be insured of the proper translation of the foreign word or phrase.

While I have shown and described a pack of cards constructed in this manner, it is, of course, understood that each pack can be formed separate with a portion of the design printed upon one of its marginal edges. However, I have found that by constructing the two packs of a single pack and then cutting the same transversely, the same can be manufactured cheaper and the design will be cut so as to properly match the design on the other pack.

While I have shown and described words or phrases of several foreign countries in the various samples of cards shown in the drawing, I wish it to be clearly understood that I do not wish to limit myself to any particular words or phrases, as subjects-matter of national interest or of special topics, can be printed upon the various cards in order to ascertain the correct solution of the questions or topics printed upon one pack, by printing the answer upon the other pack.

In playing my improved game, a player is selected to hold the entire larger pack on which is printed the expression in the foreign language. This player is called the "L'homme d'esprit". The other pack of cards, or smaller cards, containing the translations of the expressions, contained on the larger pack, is then dealt evenly to the other players.

The cards having been dealt, the "L'homme d'esprit" takes the larger pack of cards and from the top card reads the expression thereon in the foreign language to the other players. The player who holds the translation of the expression as read by the "L'homme d'esprit" or thinks he has, will at once read in English the translation of the word or phrase and if right, the "L'homme d'esprit" gives to the player who offers the right translation, the card in the original language he has read, and the player thus makes a trick of the two cards, the original and the translation.

If the translation offered is incorrect, then the player places the card, thus wrongly translated, in the middle of the table face-down in the "Pack of Errors". The "L'homme d'esprit" then reads the next card from the pack, which is continued until all of the cards have been read and the proper translation read by the other players and when any player has exhausted the supply of cards in his hand, he may draw the top card from the "Pack of Errors", thus always holding a card so as to continue the game; the object being for one player to get the most tricks.

When the players are not familiar with the foreign languages, and the "L'homme d'esprit" reads a word or phrase and one of the other players reads a translation thereof, the proof of such proper translation can be readily ascertained by matching the designs on the marginal edges of the mating cards.

It will also be seen that by constructing two packs of cards of different sizes, the larger pack having the words and translations of foreign languages printed thereon and the smaller pack having the translations of the words and phrases printed thereon, after the game has been completed and it is desired to start a new game, the larger pack which is held by the "L'homme d'esprit" can be readily assorted from the smaller pack.

I claim:

1. A set of playing cards, composed of two mating packs of cards, each card of one pack having a word or phrase of a foreign language printed thereon and a portion of a design, and each card of the other pack having a translation thereof and a matching portion of the design of a card of the first-mentioned pack.

2. A set of playing cards, composed of two packs of cards, each card of one pack having along one of its marginal edges a portion of a design, and each card of the other pack having along one of its marginal edges, the other portion of said design.

3. A set of playing cards, comprising two packs of cards of different sizes, the larger pack having the words or phrases of a foreign language printed thereon and the smaller pack having the translation of the words or phrases printed thereon, each card of the larger pack having along one of its marginal edges a portion of a design and each card of the smaller pack having along one of its marginal edges the other portion of said design.

In testimony whereof I hereunto affix my signature in the presence of two witnesses.

SHREWSBURY B. MILLER.

Witnesses:
HARVEY A. REED,
W. H. SPEDDEN.

Copies of this patent may be obtained for five cents each, by addressing the "Commissioner of Patents, Washington, D. C."